(12) United States Patent
Won (10) Patent No.: US 9,254,793 B2
(45) Date of Patent: Feb. 9, 2016

(54) CELL PHONE HOLDER

(71) Applicant: Haion Won, Hillsborough, NJ (US)

(72) Inventor: Haion Won, Hillsborough, NJ (US)

( * ) Notice: Subject to any disclaimer, the term of this patent is extended or adjusted under 35 U.S.C. 154(b) by 71 days.

(21) Appl. No.: 14/222,880

(22) Filed: Mar. 24, 2014

(65) Prior Publication Data

US 2015/0065211 A1   Mar. 5, 2015

Related U.S. Application Data

(63) Continuation-in-part of application No. 14/013,297, filed on Aug. 29, 2013, now abandoned.

(51) Int. Cl.
| | |
|---|---|
| *H04M 1/00* | (2006.01) |
| *H04W 88/02* | (2009.01) |
| *B60R 11/02* | (2006.01) |
| *B60R 11/00* | (2006.01) |

(52) U.S. Cl.
CPC ............ *B60R 11/0241* (2013.01); *B60R 11/02* (2013.01); *B60R 2011/0059* (2013.01); *B60R 2011/0075* (2013.01)

(58) Field of Classification Search
CPC ........... H04M 1/04; H04M 1/15; H04M 1/05; H04M 1/0258; H04M 1/00; B60R 11/0241; B60R 11/02; B60R 2011/0059; B60R 2011/0075; H04W 88/02

USPC ............ 455/576.6, 575.1, 575.3, 575.4, 90.3, 455/569.1

See application file for complete search history.

(56) References Cited

U.S. PATENT DOCUMENTS

| | | | |
|---|---|---|---|
| 6,712,304 B1 * | 3/2004 | Taylor ........................... | 242/379 |
| 7,539,302 B2 * | 5/2009 | Kulas ........................ | 379/433.02 |
| 8,615,849 B2 * | 12/2013 | Rothbaum et al. ............ | 24/16 R |
| 8,800,907 B2 * | 8/2014 | Koenig et al. ................. | 242/379 |
| 9,072,363 B2 * | 7/2015 | Paugh et al. | |
| 2007/0259704 A1 * | 11/2007 | Jung .......................... | 455/575.8 |
| 2011/0130174 A1 * | 6/2011 | Kroupa ...................... | 455/569.1 |
| 2012/0314351 A1 * | 12/2012 | Kroupa ..................... | 361/679.01 |

* cited by examiner

*Primary Examiner* — Pablo Tran
(74) *Attorney, Agent, or Firm* — Jonathan A. Tyler (57) ABSTRACT

A cell phone holder that has a case with a back portion having an angled surface on an inside end surface of said back side so that a cell phone housed in said case is slanted with its face tilted at an angle for better viewing through said opening in said front surface and to provide room in said case to store a retractable ear phone device behind said cell phone. The back surface has a top portion curving backward with respect to the front surface of the case to provide an overhanging portion forming a clip to mount said case and is mountable in a recess between the driver side inner window surface and the driver side inner door so that the holder hangs on the driver side below the window and near the driver so as to be within range of a driver.

17 Claims, 13 Drawing Sheets

CELL PHONE HOLDER

RELATED APPLICATION

The present application is a Continuation in Part Application of Nonprovisional application Ser. No. 14/013,297 filed on Aug. 29, 2013 and claims priority thereof under 35 USC §120.

BACKGROUND

1. Field

The present invention relates to a cell phone holder. In particular the present invention relates to a cell phone holder suitable for holding a telephone in an automotive vehicle in a location near the driver for hands free and within easy communication range for the driver.

2. The Related Art

Use of cell phones in automotive vehicles can prove to be a distraction for many users while driving leading to accidents on the road. It would be desirable to avoid such problems and provide a cell phone holder that is hands free and can be located near the driver and does not block, even partially, the front windshield of the automotive vehicle due to mounting of a cell phone holder by impairing the vision of the driver in the front windshield.

SUMMARY

It is therefore desirable to provide a cell phone particularly for use in an automotive vehicle that avoids the aforementioned problems and is able to provide for hands free access to it and which can be located near the driver and does not block, even partially, the front windshield of the automotive vehicle due to its mounting.

The present invention provides for a cell phone holder that has a case with a back portion having an angled surface on an inside end surface of said back side so that a cell phone housed in said case is slanted with its face tilted at an angle for better viewing through said opening in said front surface and to provide room in said case to store a retractable ear phone device behind said cell phone.

The back surface has a top portion curving backward with respect to the front surface of the case to provides an overhanging portion forming a clip to mount said case is mountable in a recess between the driver side inner window surface and the driver side inner door so that the holder hangs on the driver side below the window and near the driver so as to be within range of a driver. In this way a driver can speak and hear clearly while communicating on the phone while it is held in the cell phone holder while his hands are free to drive with the steering wheel of the automotive vehicle. This minimizes any distractions while communicating on the cell phone and still permits the driver to access his phone. During a telephone conversation the driver will have the cell phone near him or her, be able to easily speak and hear the other caller's voice while driving in a safer hands free environment.

DETAILED DESCRIPTION OF THE PREFERRED EMBODIMENT

Referring now to the drawings of FIGS. 1-10, FIGS. 1 and 5 show a front view of a cell phone holder or case 5 suited for use in automotive vehicles in accordance with the teachings of the present invention. The cell phone holder 5 has a front portion 6 that has a large opening 7 to accommodate the ability for a user to view the screen of the cell phone and to access the cell phone while it is housed in the holder 5 or case 5. The interior of the holder 5 has interior side walls 8 and a predominantly U shaped back wall 9 that is angled on one side 10, preferably at an angle 0 to 120 degrees so as to tilt the side of the cell phone against that angled side 10 of the U shaped back wall 9. Recessed behind the U shaped back wall 9 is a substantially flat back wall 13 that extends at its top area 25 into a curved portion 26 bending in an opposite direction away from the front portion 6 of the holder to form a clip 15 for mounting the holder 5. The space between the angled back wall side 10 and the flat back wall 13 provides room for storing a retractable ear phone set in the holder 5 behind the cell phone.

Figure 1:
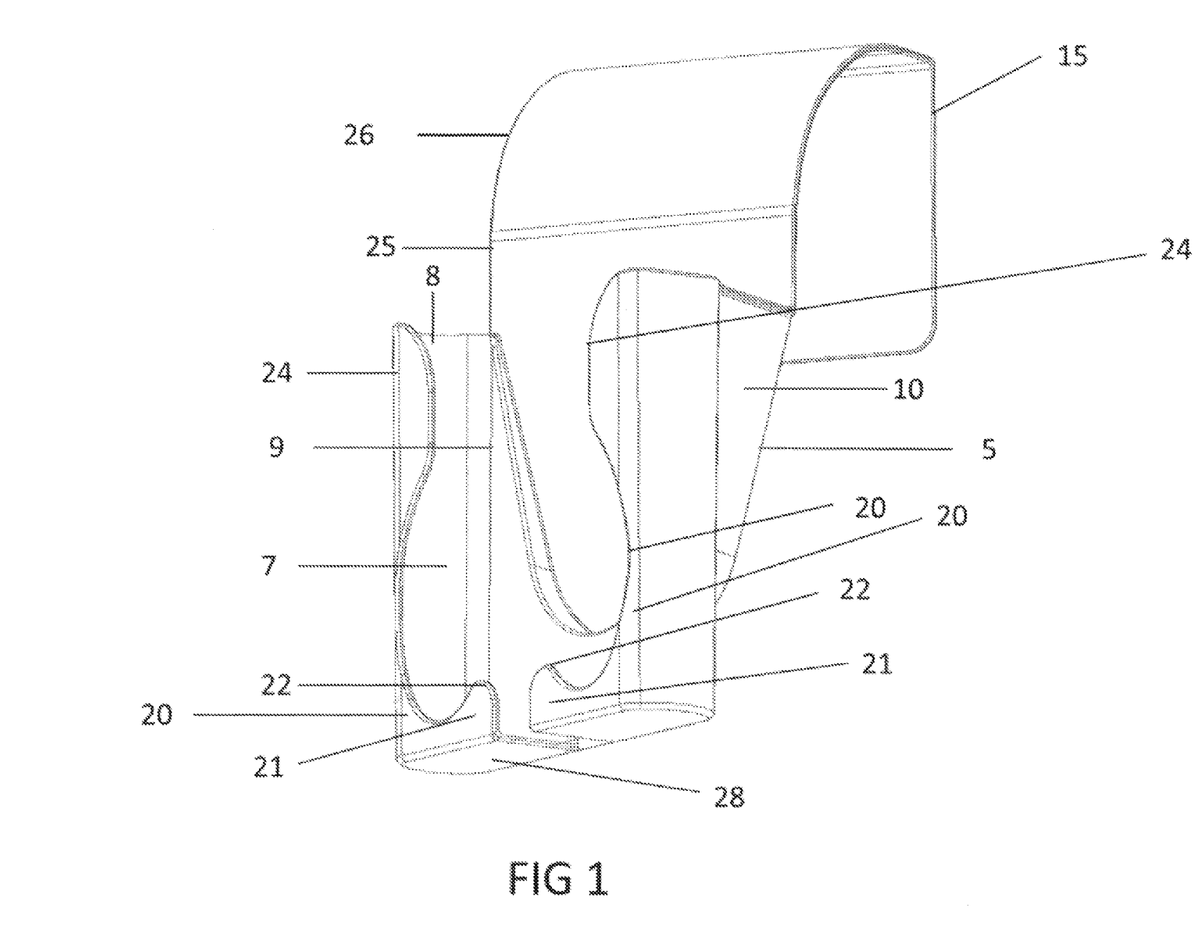
FIG. 1 is a perspective front view of the present invention.
Figure 5:
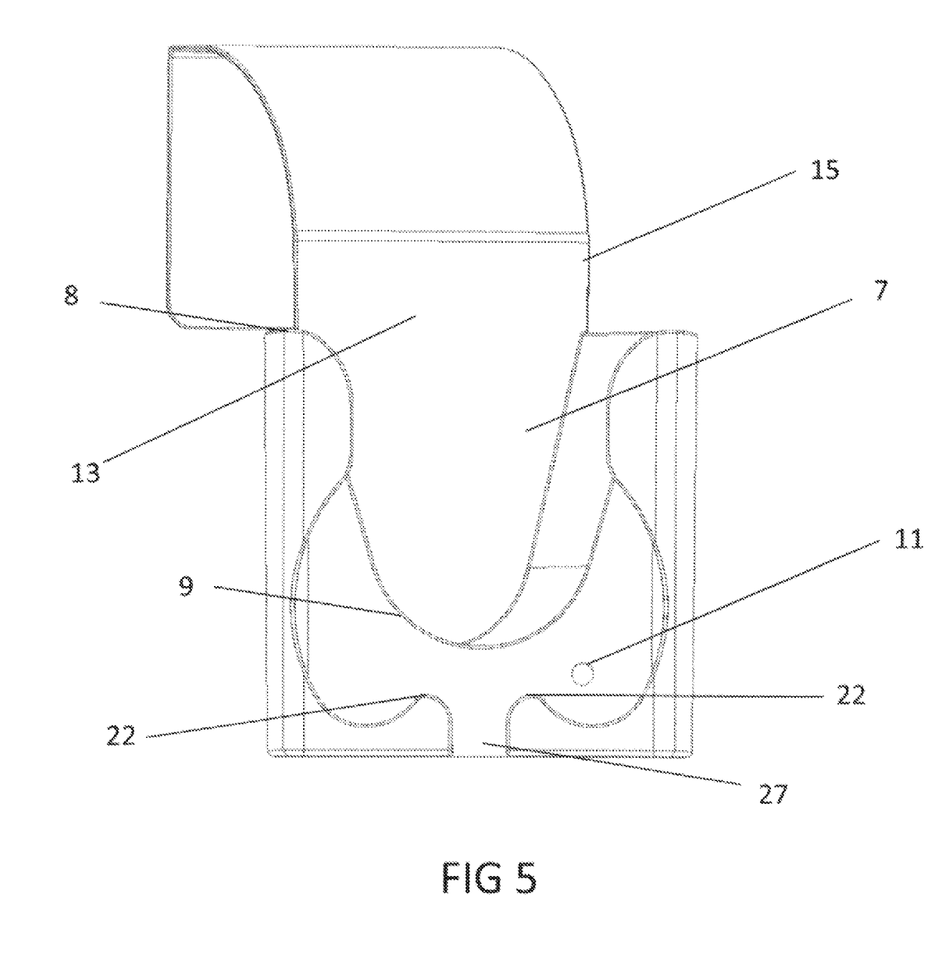
FIG. 5 is a front view of the present invention.
Figure 9:
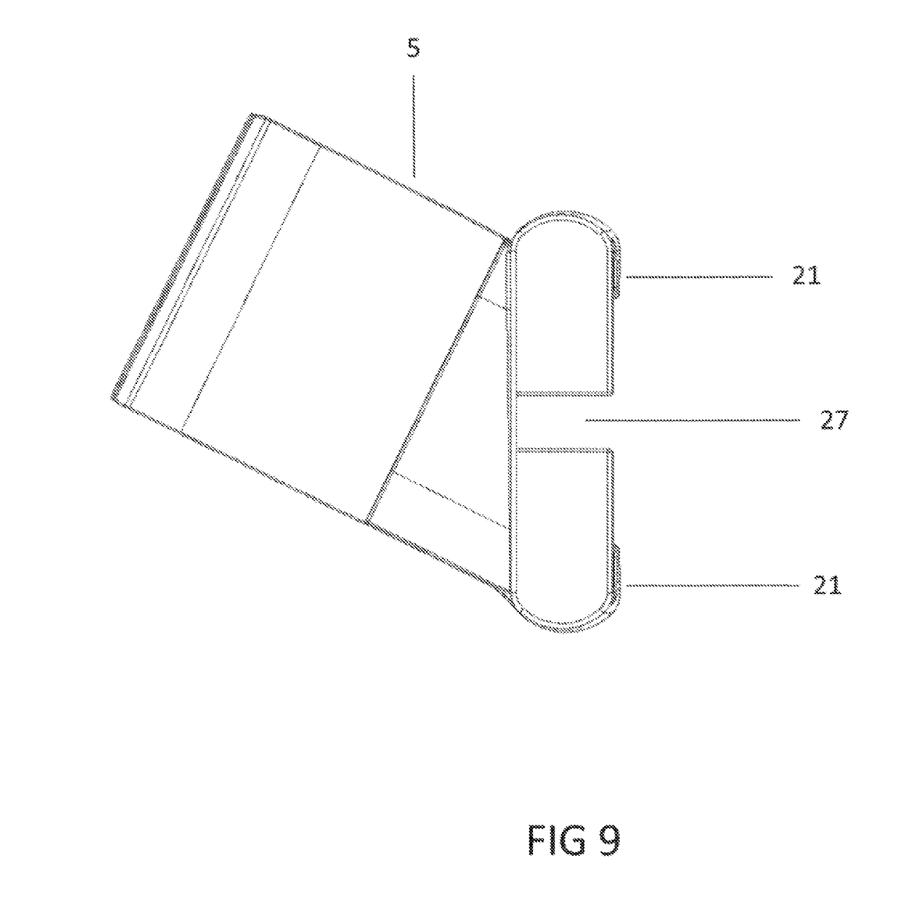
FIG. 9 is a bottom view of the present invention.
Figure 10:
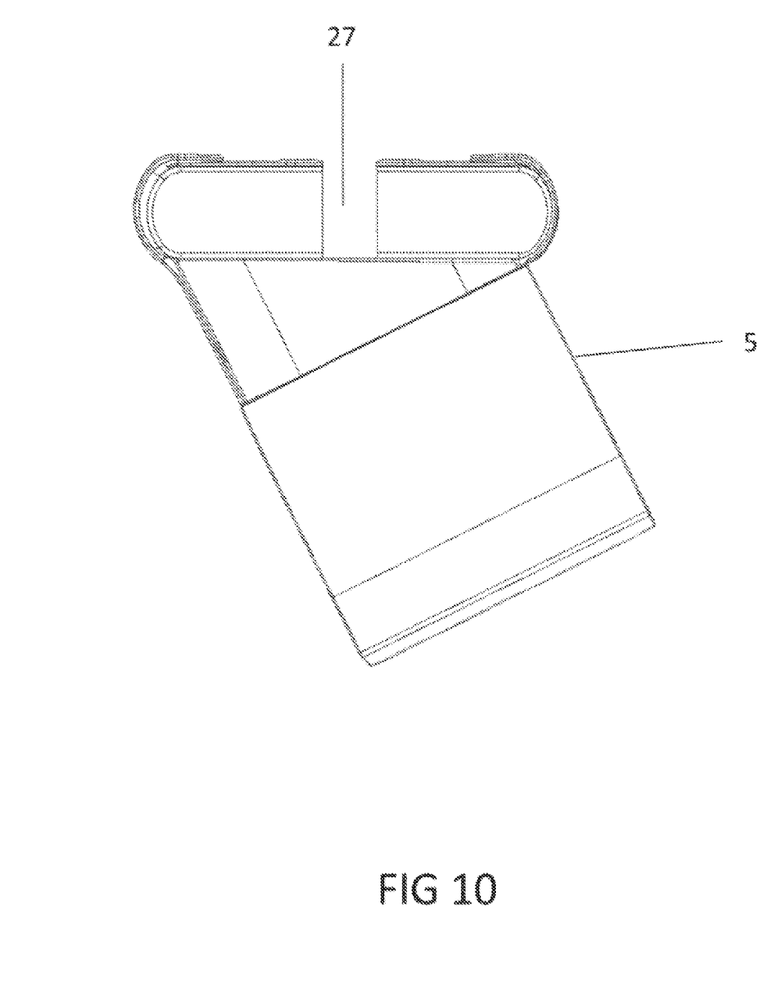
FIG. 10 is a top view of the present invention.

The front portion 6 is formed of two side front parts 20 that frame the opening 7 and extend down to form bottom front portions 21 terminating with raised portions 22 spaced apart from each other by an opening 27 in the front 6 and the bottom 28 (see FIGS. 1, 4 and 9) that make it easier to lift the cell phone up from the holder 5. The two raised portions 22 serve to retain the cell phone within the holder 5 and prevent it from falling out of the holder 5. The opening 28 between the two bottom front portions 22 is not only at the front of the cell phone but also extends through the front part of the bottom surface 28 of the holder 5 as seen in FIGS. 1, 5 and 9.

The clip portion 15 is preferably sufficiently thin to be inserted in a recess in the driver side window between the window and inner door panel. Preferably the clip 15 has thickness of 1 mm. This permits a driver to speak and to hear clearly while communicating on the phone while it is held in the cell phone holder while his hands are free to drive with the steering wheel of the automotive vehicle. The holder 5 can also be mounted in any other suitable location using the clip portion 15 of the holder 5 for mounting but preferably it will be used as described above.

The holder 5 is preferably made of a rigid plastic material such as but not limited to polypropylene (PP) or polyethylene (PE) or any other suitable commercially available material. The bottom of the holder 5 is preferably narrower than the top portion of the holder 5 so that the holder 5 is sized for housing a variety of different sized cell phones.

Figure 2:
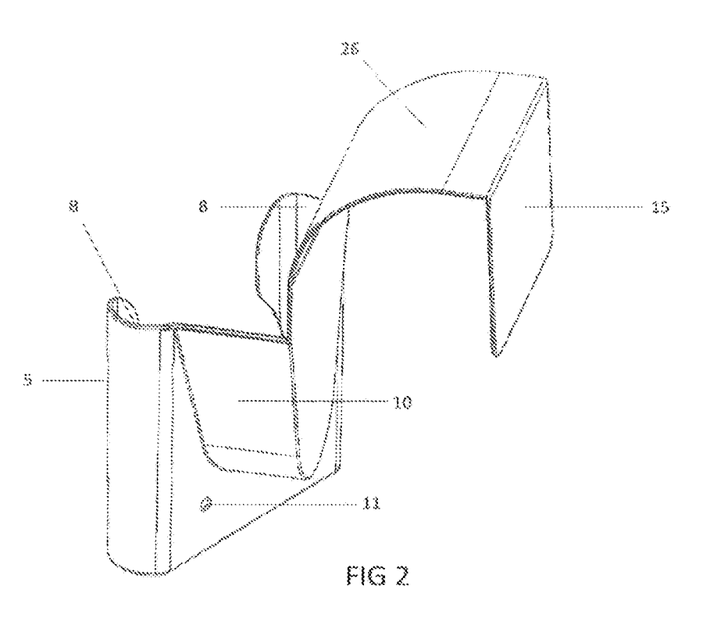
FIG. 2 is a perspective rear view of the present invention.
Figure 3:
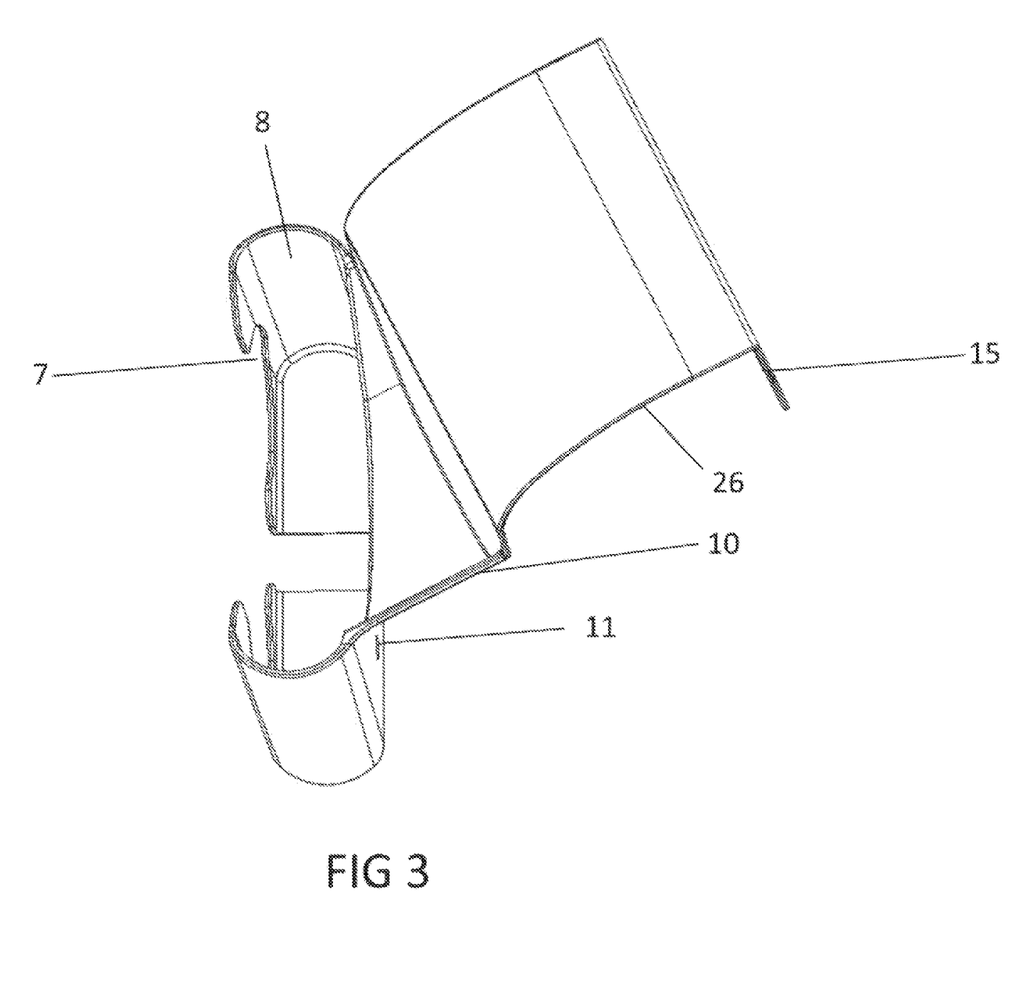
FIG. 3 is a perspective top view of the present invention.
Figure 4:
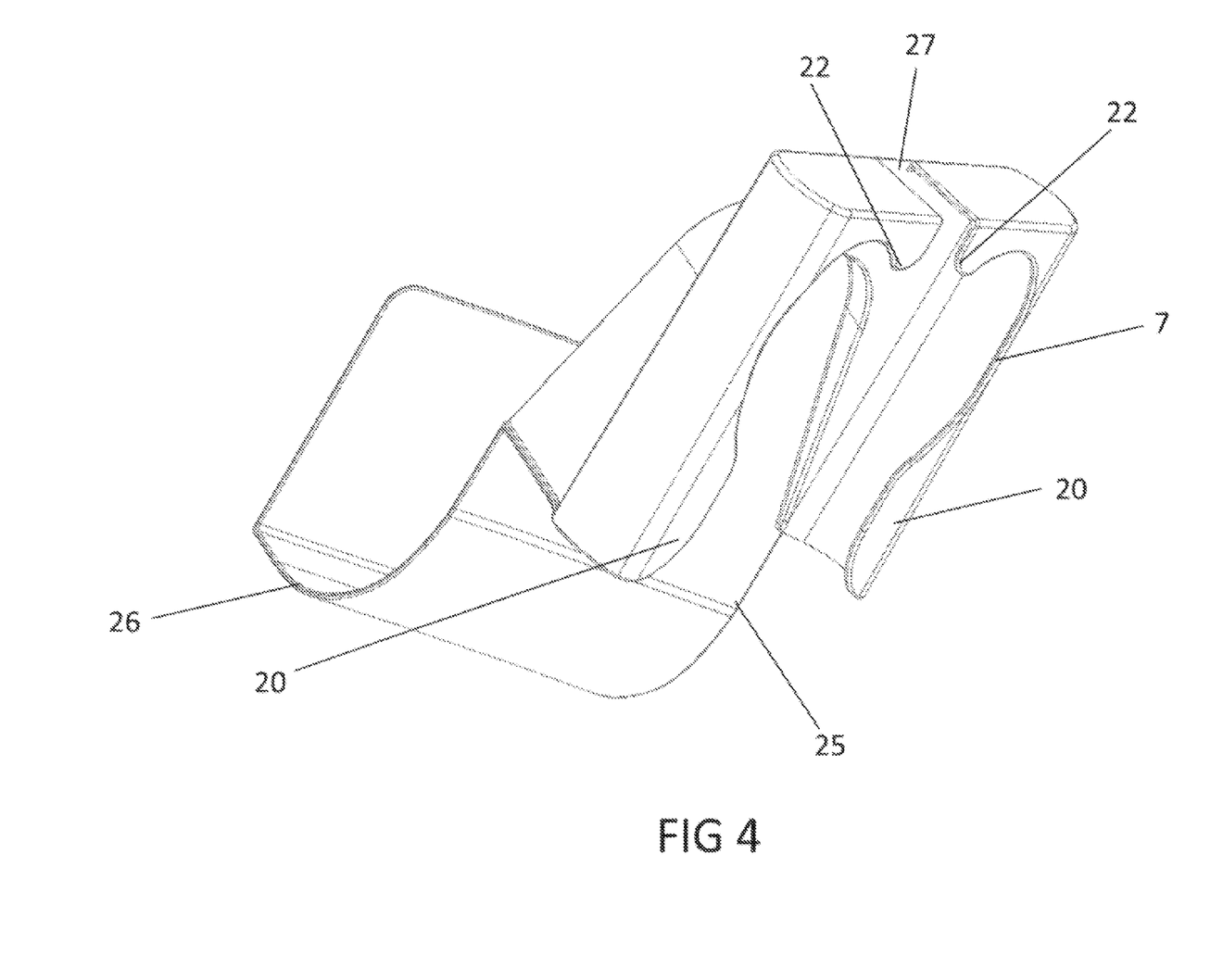
FIG. 4 is a perspective bottom view of the present invention.
Figure 6:
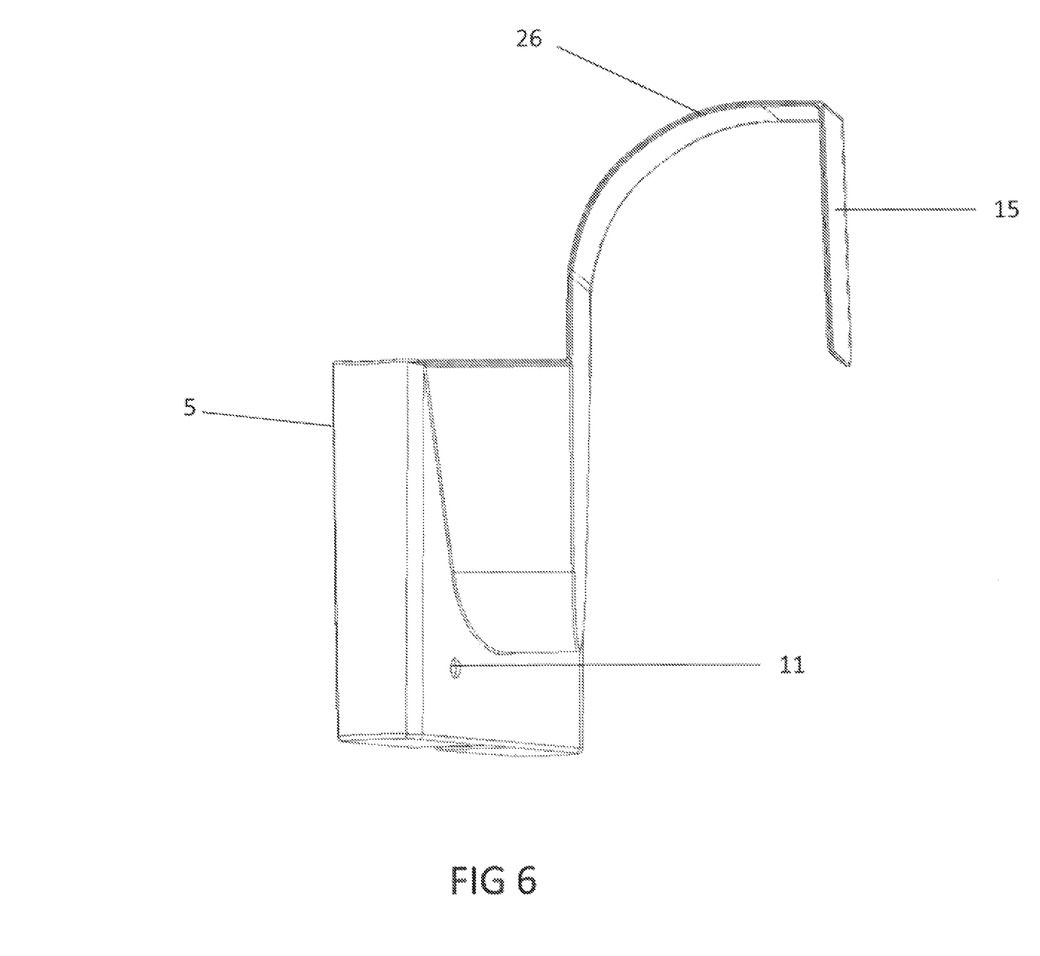
FIG. 6 is a left side view of the present invention.
Figure 7:
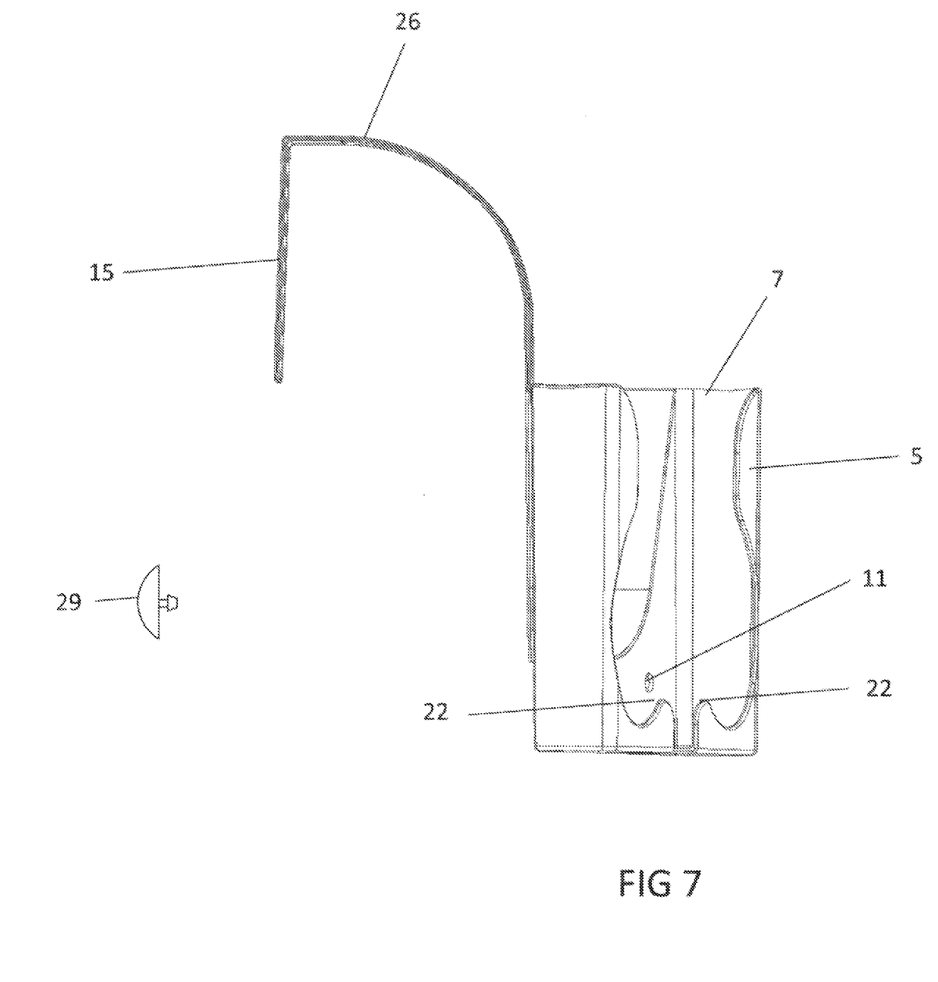
FIG. 7 is a right side view of the present invention.
Figure 8:
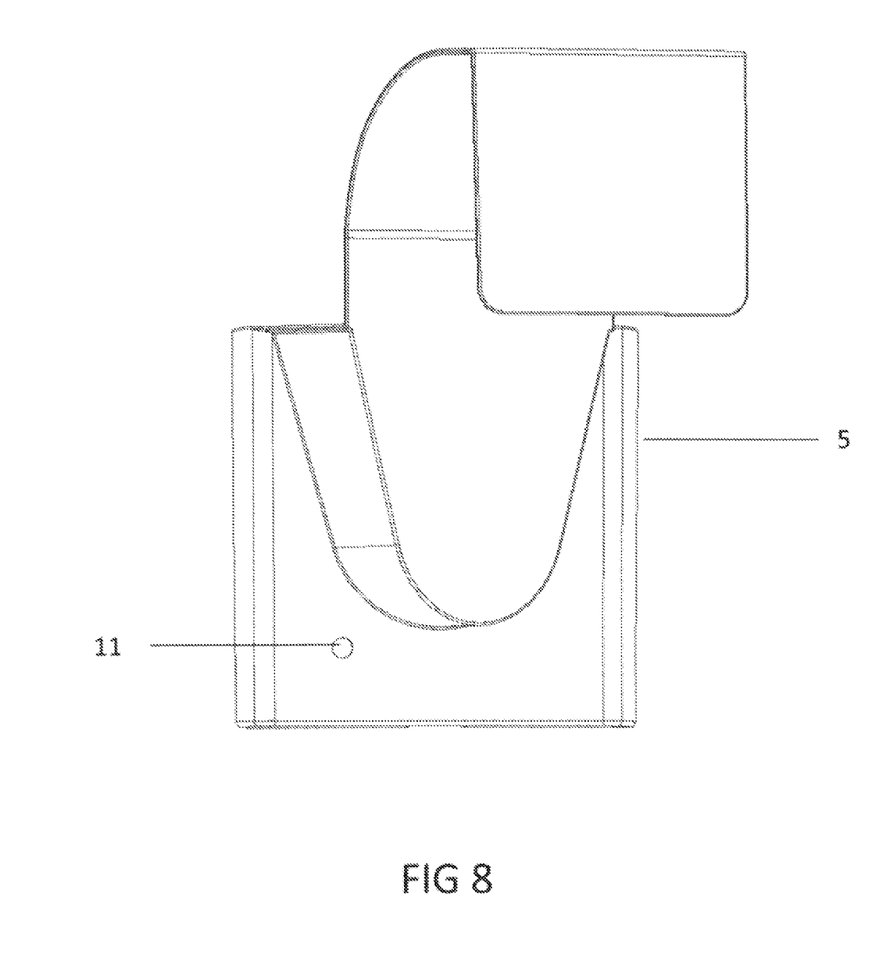
FIG. 8 is a rear view of the present invention.

A seen in FIGS. 2, 6 and 7 the back side of the holder 5 preferably has a hole 11 in which to place the rubber or silicon cushion 29 or any other suitable material known in the art to prevent the cell phone from wobbling inside the holder 5.

Figure 11A:
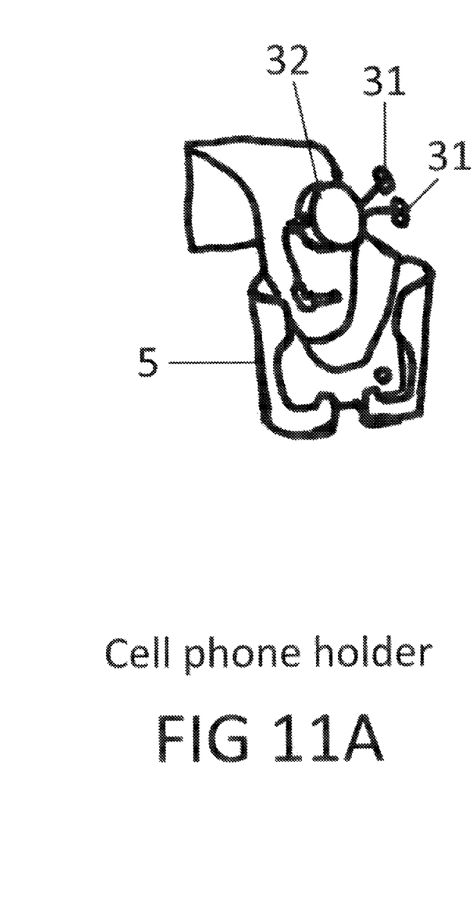
FIG. 11A shows the cell phone holder of the present application with a double stick tape thereon.
Figures 11B, 11C:
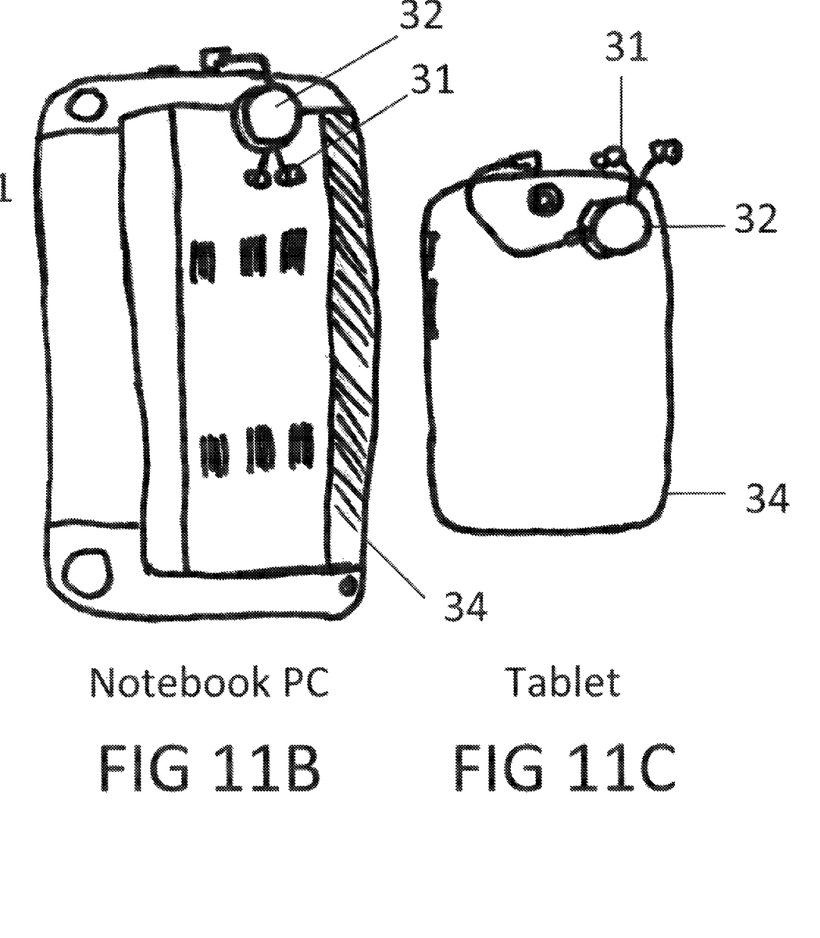
FIG. 11B shows a notebook holder with a double stick tape.
FIG. 11C shows a tablet with a double stick tape thereon.

FIGS. 11A, 11B and 11C show various double stick tape applications. As seen in FIGS. 11A, B and C double stick tape can be applied to the back of unilateral pulling retractable ear phones 31. Only unilateral pulling retractable earphones 31 can have a double stick tape on the back of the axle 32 because the axle 32 is not moving when earphones 31 retract or pull. Since the axle 32 of double side pulling earphones 31 moves along with earphones 31, no one can have a double stick tape on the back.

FIG. 11A shows the cell phone holder of the present application with a double stick tape thereon. 11B shows a notebook holder 33 with a double stick tape thereon. FIG. 11C shows a tablet 34 with a double stick tape thereon.

Figure 12:
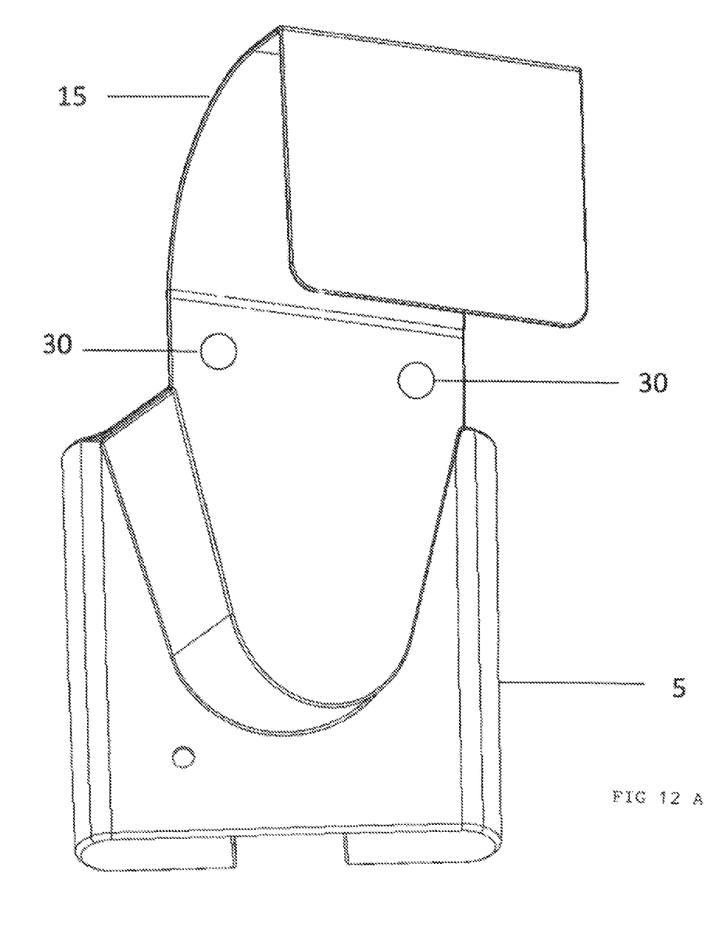
FIG. 12A illustrates another embodiment of the present invention showing a perspective back view in which protrusions are dispose don the back surface of the clip of the holder.
FIG. 12B is a side view of the same embodiment of FIG. 12A showing one of the protrusions on the clip of the holder.

FIGS. 12A and 12B respectively show another embodiment of the back and side of the present invention in which a pair of protrusions 30, preferably made of plastic material, are located on the back of the clip 15 of the cell phone holder 5 to reduce rattling noises when the vehicle hit a bump so as to be less disruptive to the driver and passengers in the vehicle. The protrusions 30 are preferably manufactured together with the holder 5 such as by non limiting example by injection molding.

While presently preferred embodiments have been described for purposes of the disclosure, numerous changes in the arrangement of method steps and apparatus parts can be made by those skilled in the art. Such changes are encompassed within the spirit of the invention as defined by the appended claims.

What is claimed:

1. A cell phone holder, comprising:
a holder adapted to accommodate a cell phone therein, said holder having a front surface with an opening through which a cell phone housed therein is visible and can be accessed easily;
said holder having a back portion having an angled surface on an inside end surface of said back side so that a cell phone housed in said holder is slanted with its face tilted at an angle for better viewing through said opening in said front surface and to provide room in said holder to store a retractable ear phone device behind said cell phone; and
said back surface having a top portion curving backward with respect to the front surface of the holder to provide an overhanging portion forming a clip to mount said holder so as to provide a hands free environment for the cell phone when housed within the holder.

2. The cell phone holder according to claim 1 wherein said angled surface is within the range of 0-120 degree angle.

3. The cell phone holder according to claim 1 wherein said holder includes said front portion being formed with a wide opening and having two small proturbance shaped portions at a bottom of said front portion on each side of said opening to keep said cell phone from falling out.

4. The cell phone holder according to claim 2 wherein said two proturbance shaped portions have a space in between to facilitate removal of said cell phone from said holder and minimize any wobbling by the cell phone said holder.

5. The cell phone holder according to claim 1 wherein said holder has a bottom portion that is narrower than a top portion of said holder so that wider cell phones can be housed within said holder.

6. The cell phone holder according to claim 1 wherein said clip has a clip portion that is adapted to be inserted in a driver side window recess between the interior of the driver's window side and the interior driver side door panel.

7. The cell phone holder according to claim 6 wherein said clip portion is approximately 1 mm thick.

8. The cell phone holder according to claim 1 wherein said clip of holder has pair of protrusions on its back surface to reduce rattling noise of said holder when said holder is in said recess and experiences a bump.

9. In combination a cell phone holder and an automotive vehicle, comprising:
a holder adapted to accommodate a cell phone therein, said holder having a front surface with an opening through which a cell phone housed therein is visible and can be accessed easily;
said holder having a back portion having an angled surface on an inside end surface of said back side so that a cell phone housed in said holder is slanted with its face tilted at an angle for better viewing through said opening in said front surface and to provide room in said holder to store a retractable ear phone device behind said cell phone; and
said back surface having a top portion curving backward with respect to the front surface of the holder to provide an overhanging portion forming a clip to mount said holder, said clip has a clip portion that is adapted to be inserted in a driver side window recess between the interior of the driver's window side and the interior driver side door panel of an automotive vehicle a narrow recess into which to insert the clip portion of the cell phone holder so that it hangs on the driver side window below the window and near the driver so as to be within range of a driver so that a driver can speak and hear clearly while communicating on the phone while it is held in the cell phone holder while his hands are free to drive with the steering wheel of the automotive vehicle.

10. The combination according to claim 9 wherein said angled surface is within the range of 0-120 degree angle.

11. The combination according to claim 9 wherein said holder includes said front portion being formed with a wide opening and having two small proturbance shaped portions at a bottom of said front portion on each side of said opening to keep said cell phone from falling out.

12. The combination according to claim 11 wherein said two proturbance shaped portions have a space in between to facilitate removal of said cell phone from said holder and minimize any wobbling by the cell phone said holder.

13. The combination according to claim 9 wherein said holder has a bottom portion that is narrower than a top portion of said holder so that wider cell phones can be housed within said holder.

14. The combination according to claim 9 wherein said clip has a clip portion that is adapted to be inserted in a driver side window recess between the interior of the driver's window side and the interior driver side door panel.

15. The combination according to claim 9 wherein said clip portion is approximately 1 mm thick.

16. The combination according to claim 9 wherein said retractable ear phone device behind said cell phone is a unilateral pulling retractable ear phone to which a double stick tape on the back of the unilateral, pulling retractable ear phones.

17. The combination according to claim 9 wherein said clip of holder has pair of protrusions on its back surface to reduce rattling noise of said holder when said holder is in said recess and experiences a bump.

* * * * *